United States Patent
Kacker

(10) Patent No.: US 7,467,222 B2
(45) Date of Patent: Dec. 16, 2008

(54) IMAGE RANKING FOR IMAGING PRODUCTS AND SERVICES

(75) Inventor: Dhiraj Kacker, Burlingame, CA (US)

(73) Assignee: Shutterfly, Inc., Redwood City, CA (US)

( * ) Notice: Subject to any disclaimer, the term of this patent is extended or adjusted under 35 U.S.C. 154(b) by 271 days.

(21) Appl. No.: 11/432,906

(22) Filed: May 12, 2006

(65) Prior Publication Data

US 2006/0203261 A1  Sep. 14, 2006

Related U.S. Application Data

(63) Continuation of application No. 10/392,304, filed on Mar. 20, 2003, now abandoned.

(51) Int. Cl.
*G06F 15/16* (2006.01)

(52) U.S. Cl. .................. 709/232; 358/1.15; 382/224

(58) Field of Classification Search ......... 709/200–203, 709/217–232; 382/170, 175, 224, 284; 345/660; 358/1.15
See application file for complete search history.

(56) References Cited

U.S. PATENT DOCUMENTS

| | | | |
|---|---|---|---|
| 5,740,270 A | | 4/1998 | Rutenberg |
| 6,169,998 B1 | | 1/2001 | Iwasaki |
| 6,324,545 B1 | | 11/2001 | Morag |
| 6,606,411 B1 | * | 8/2003 | Loui et al. ............... 382/224 |
| 6,636,648 B2 | * | 10/2003 | Loui et al. ............... 382/284 |
| 6,671,405 B1 | * | 12/2003 | Savakis et al. ............. 382/203 |
| 6,738,494 B1 | * | 5/2004 | Savakis et al. ............. 382/100 |
| 6,748,097 B1 | * | 6/2004 | Gindele et al. ............. 382/112 |
| 6,832,006 B2 | * | 12/2004 | Savakis et al. ............. 382/239 |
| 6,847,733 B2 | * | 1/2005 | Savakis et al. ............. 382/225 |
| 6,961,463 B1 | * | 11/2005 | Loui et al. ............... 382/170 |
| 2002/0154147 A1 | * | 10/2002 | Battles ................. 345/660 |
| 2003/0072486 A1 | * | 4/2003 | Loui et al. ............... 382/175 |
| 2003/0198390 A1 | * | 10/2003 | Loui et al. ............... 382/224 |

* cited by examiner

*Primary Examiner*—Moustafa M Meky
(74) *Attorney, Agent, or Firm*—Xin Wen

(57) ABSTRACT

A computer-assisted method provides a plurality of digital images, selects a digital image, obtains one or more image characteristics of the selected digital image, computes one or more image-ranking values for the selected digital image based on the obtained image characteristics of the selected digital image, and ranks the selected digital image using the computed image-ranking values.

20 Claims, 3 Drawing Sheets

IMAGE RANKING FOR IMAGING PRODUCTS AND SERVICES

The present invention is a continuation patent application of the commonly assigned U.S. patent application Ser. No. 10/392,304, titled "Image ranking for imaging products and imaging services" by Kacker, filed Mar. 20, 2003 now abandoned. The present invention is related to commonly assigned U.S. patent application Ser. No. 09/436,704, filed on Nov. 9, 1999, titled "Distributing Images to Multiple Recipients", by Baum, U.S. patent application Ser. No. 09/450,075, filed on Oct. 27, 1999, titled "Printing Images in an Optimized Manner", U.S. patent application Ser. No. 09/428,871 filed Oct. 27, 1999, titled "Multi-Tier Data Storage System", U.S. patent application Ser. No. 09/721,484, filed on Nov. 22, 2000, titled "User Interface and Methods for On-line Print Service", U.S. patent application Ser. No. 09/450,804, filed on Nov. 29, 1999, titled "Image Uploading", U.S. patent application Ser. No. 09/560,609, filed on Apr. 28, 2000, titled "System and Method of Providing a User Interface for Changing Attributes of an Image-based Product", U.S. patent application Ser. No. 09/684,595, filed on Oct. 5, 2000, titled "Previewing a framed image print ", U.S. patent application Ser. No. 9/972,602, filed on Oct. 5, 2000, titled "Managing and searching digital images", U.S. patent application Ser. No. 10/106,902, filed on Mar. 25, 2002, titled "Producing and sharing personalized photo calendar", and U.S. patent application Ser. No. 10/185,862, filed Jun. 28, 2002, titled "Personalized photo greeting cards". The disclosures of these related applications are incorporated herein by reference.

TECHNICAL FIELD

This application relates to systems and methods for ranking images for imaging products and services.

BACKGROUND

Digital images have significantly increased popularity in recent years due the spread of various image capture devices such as digital cameras, reflective scanners, film scanners, and video and still cameras. Depending the properties of the image capture device, digital images can exist in various sizes, image and color formats. The digital images may be captured at different exposure conditions, and may be of different pixel value distributions and color balances. The captured digital images may also be edited or processed using an image editing software such as Adobe Photoshop. Digital images are also used for different applications, including electronic sharing on a display device such as a computer monitor or a TV monitor, making hardcopy prints in various sizes, making image-based products such as greeting cards, holiday cards, photo calendars, posters, T-shirts, mugs, mouse pads and so on. The requirements on the digital images can be different for different image application.

SUMMARY

Methods and apparatus for ranking images for imaging product and services are disclosed. In one aspect, the present invention provides a computer-assisted method, comprising: a) providing a plurality of digital images; b) selecting a digital image; c) obtaining one or more image characteristics of the selected digital image; d) computing one or more image-ranking values for the selected digital image based on the obtained image characteristics of the selected digital image; and e) ranking the selected digital image using the computed image-ranking values.

In another aspect of the present invention, a system is provided for producing an imaging product, comprising: a) a server that receives digital images; b) a computer processor that ranks the digital images according to one or more predetermined criteria; and c) a printing and finishing facility for producing an imaging product using one or more digital images selected using the result of ranking.

In other aspects, the present invention provides an image ranking system and methods for selecting digital images for various purposes. Examples of the application include one or more of the following: First, a user can delete digital images that receive low-quality ranking values to free up storage space and simplify image organization. Secondly, a user can use the image ranking values to guide which images are likely to produce good quality prints. Thirdly, a user may use the image ranking values as indication of which images are suitable for sharing. Fourth, a user can use image-ranking values to select images of the same scene subject.

In yet another aspect, the present invention can provide recommendations for image usages based on the image ranking of the digital images. The present invention also allow user to search for images having image ranking above certain criterion values.

In still another aspect, the calculations in the image ranking can be specific to the intended applications. Higher weight can be given to the input image characteristics that are important to a particular intended product.

In yet another aspect, the image ranking methods in the present invention can be used to assist or in conjunction with human image evaluations by an imaging service provider. As a result, the labor cost is reduced from visually examining the images.

An advantage of the present invention is to simplify the management and organization of digital images for users.

Another advantage of the present invention is to provide guidance to users on the suitability of digital images for being used in various image products, which makes the selection of the images much easier for the users. The image ranking can be customized according to each user's preference and application needs.

Yet another advantage of the invention is that the image ranking was based on predetermined computation algorithms. The image ranking can be automatically calculated as new images are uploaded to the online photo system and stored in a user's account. The arbitrariness of human image-quality judgment is removed. The time used for making the judgment is saved or reduced.

The details of one or more embodiments are set forth in the accompanying drawings and in the description below. Other features, objects, and advantages of the invention will become apparent from the description and drawings, and from the claims.

DRAWING DESCRIPTIONS

DETAILED DESCRIPTION

Figure 1:
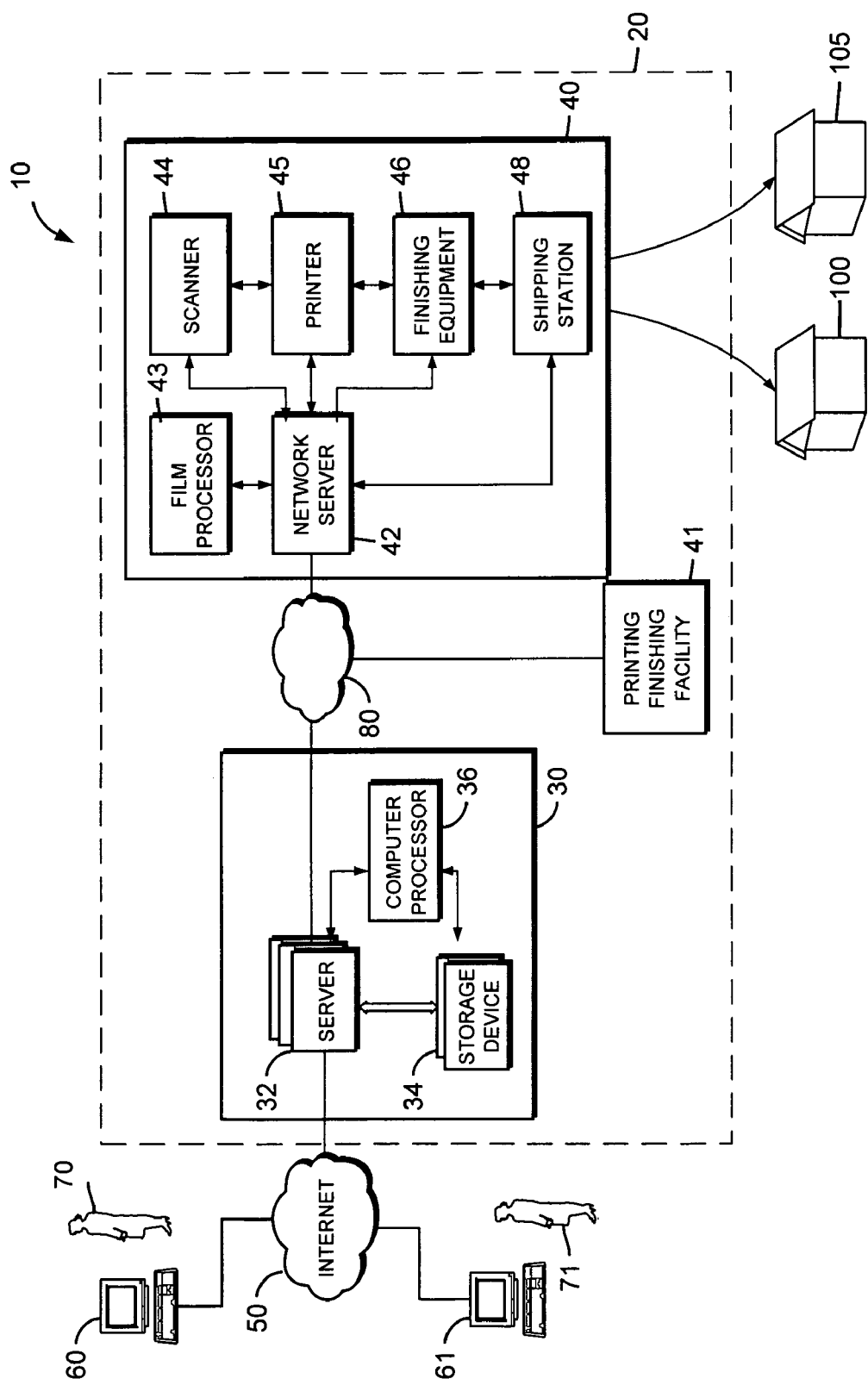
FIG. 1 is a block diagram of a system for producing personalized image-based products for gift products in accordance with the present invention.

FIG. 1 shows a block diagram of the system 10 for producing personalized image-based products in accordance with the present invention. An online photo system 20 is established by a photo service provider to provide photo services on a wide area network such as the Internet 50. The online photo system 20 includes a data center 30 and one or more printing and finishing facilities 40 and 41

In accordance with the present invention, the term "personalized" is used in personalized information, personalized message, personalized image, and personalized design, etc. The term "personalized" refers to the information that is specific to the recipient, the user, the gift product, or the intended occasion. In other words, "personalized" information is "individualized" or "customized", and is not generally applicable to all gift products.

The data center 30 includes one or more servers 32, data storage devices 34 for storing image data, user account and order information, and one or more computer processors 36 for processing orders and rendering digital images. An online-photo website is powered by the servers 32 to serve as a web interface between the users 70 and the photo service provider. The users can order photo products from the web interface. The printing and finishing facilities 40 and 41 produces the ordered photo products such as photographic prints, greeting cards, photo albums, photo calendars, photo books, photo T-shirt, photo mugs, record images on compact disks (CDs), and framed photo prints. In accordance with the present invention, the greeting cards include folded greeting cards, postcards, trading cards such as baseball cards or game cards, and other form of cards. The users 70 can personalize their greeting cards by including an image uploaded from the website.

The architecture of the data storage devices 34 is designed to optimize the data accessibility, the storage reliability and the cost. Further details on the image data storage in online photo system 20 are provided in the commonly assigned and above referenced U.S. patent application Ser. No. 09/428,871 filed Oct. 27, 1999, titled "Multi-Tier Data Storage System", which is incorporated herein by reference.

The printing and finishing facilities 40 and 41 can be co-located at the data center 30. Alternatively, the printing and finishing facility 40 and 41 can be located remotely from the data center 30. Multiple printing and finishing facilities 40 and 41 can be set up so that each printing and finishing facility 40 and 41 can be located geographically close to a large population of customers to shorten order delivery time. Furthermore, the printing and finishing facilities 40 and 41 and the data center 30 can be owned and operated by different business entities. For example, the data center 30 can be owned by a first business entity that hosts a website that provides a web front and web user interface for the user 70. The printing and finishing facilities 40 and 41 can be owned by a second business entity that fulfills the photo product orders that are received from the data center 30. In this particular arrangement, the second business entity is often referred as an Application Service Provider (ASP). The photo service provider can provide services to its customers from its own website, as well as fulfill (i.e. ASP) photo products for websites hosted by other business entities.

The printing and finishing facility 40 includes network servers 42 for communicating with the data center 30, printers 45 for printing images on physical surfaces, finishing equipment 46 for operations after the images are printed, and shipping stations 48 for confirming the completion of the orders and shipping the ordered photo products to recipients 100 and 105 (the user 70 can be a recipient). The printers 45 take digital data input and produces images on a receiver. Examples of printer 45 include can be digital photographic printers such as Fuji Frontier Minilab printers, Kodak DLS minilab printers, Gretag CYRA FastPrint digital photo printer, or Kodak I-Lab photo printers. The printers 45 can also include offset digital printers or digital printing presses such as HP Indigo UltraStream 2000 digital printing press, Xerox's DocuColor printers etc. The printers 45 can also include large format photo or inkjet printers for printing posters and banners. The printing and finishing facilities 40 and 41 can include a film processor 43 for processing exposed films, and a scanner 44 for digitizing a processed film stripe. The network servers 42 are connected with the data center 30 via a computer network 80 such as a Local Area Network or a Wide Area Network. The order information and image data can be transferred from servers 32 to the network servers 42 using a standard or a proprietary protocol (FTP, HTTP, among others). The finishing equipment 46 can perform any operations for finishing a complete photo product other than photo printing such as cutting, folding, adding a cover to photo book, punching, stapling, gluing, binding, envelope printing and sealing, packaging, labeling, weighing and postage metering. The finishing operations can also include framing a photo print, recording image data on a CD-ROM, etc. Furthermore, the printers and the finishing equipments can be located in different sites. Some finishing operations can be fulfilled by an external contractor.

Figure 2:
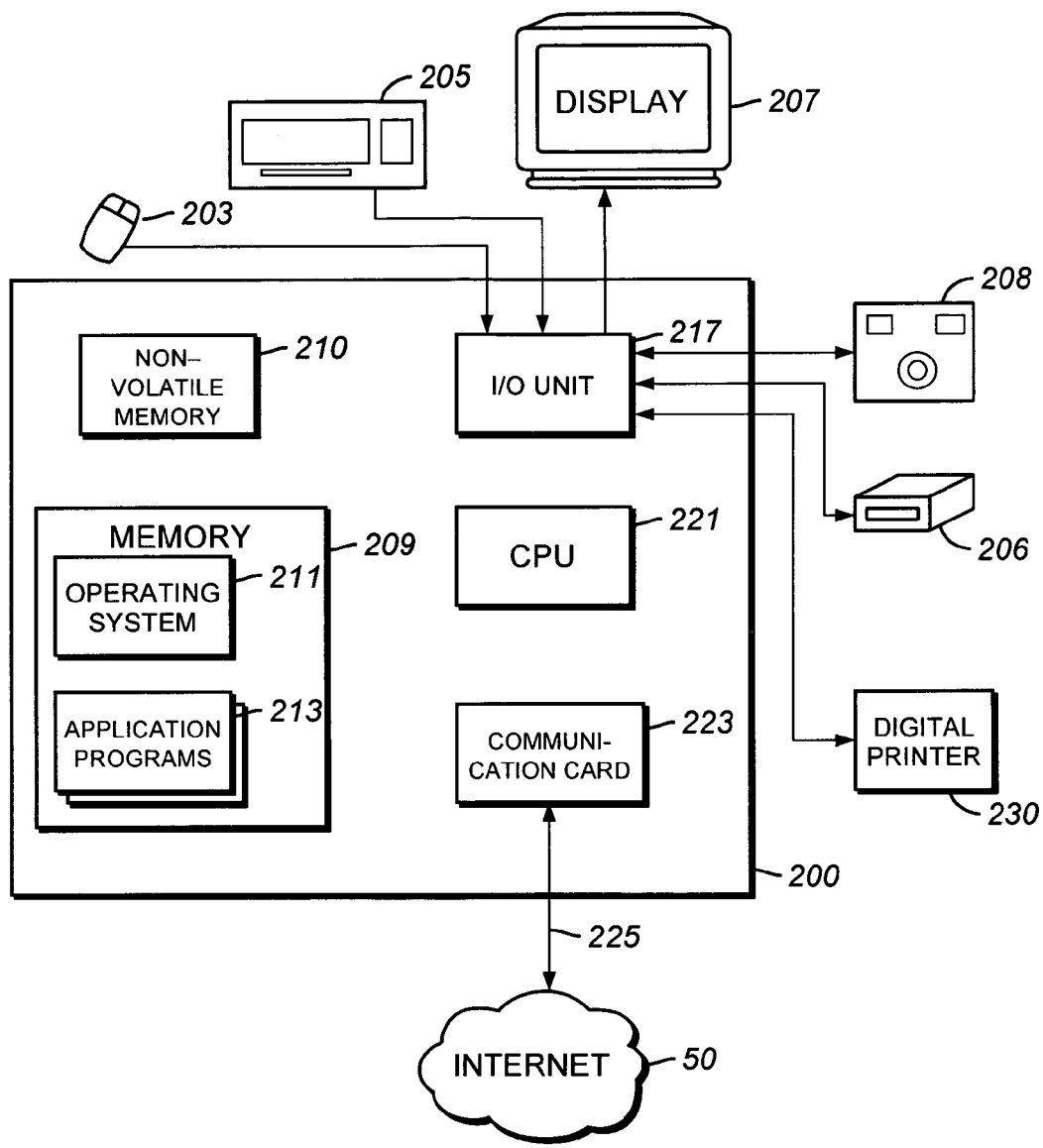
FIG. 2 shows a typical computer that a customer uses for receiving digital image data from a digital image capture device and for accessing a photo hosting website on the Internet.

A user 70 can access the online-photo website using a computer terminal 60 as shown in FIG. 2. The computer terminal 60 can be a personal computer located at a home or at a business, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a floppy disk, CD-ROM, or other removable storage media) and a communications device 223 (e.g., a modem or network adapter) for exchanging data with an Internet 50 via a communications link 225 (e.g., a telephone line).

The computer 200 allows the user 70 to connect to the online-photo website using the communications card or device 223. The user 70 can set up and access her personal account. The user 70 can enter user account information such as the user's name, address, payment information (credit card number), and information about the recipient of the photo products ordered by the user 70. The user 70 can also enter payment information such as credit card number, the name and address on the credit card etc. The user 70 can also send (i.e. upload) digital image data to the online-photo website. In accordance with the present invention, the user can store the images in an online photo album, create personalized image-based product at the web user interface, and order a personal image-based product and a gift product for specified recipients 100 and 105.

The computer 200 of FIG. 2 can also be connected to various peripheral I/O devices such as an image capture device (digital camera, film scanner or reflective scanners). One such peripheral device is a digital camera 208 that enables users to take pictures and save them in digital (electronic) format. Typically, the digital camera 208 is connected to the computer 200 only while the user is transferring images to the computer's disk drive or other non-volatile memory 210. The digital camera 208 can be connected to the computer 200 using a Firewire or an USB port, from a camera cradle (e.g. Kodak DX3900 using an EasyShare Camera Dock), or over wireless media such as radio or optical medium. The digital images captured by a digital camera are typically stored in memory card (e.g., SmartMedia™ or Compact-Flash™) that are detachable from the digital camera. The digital images on a memory card can be transferred to the computer 200 using a card reader 206 and saved on non-volatile memory 210.

The user 70 can also obtain digital images from film-based prints from a traditional camera, by sending an exposed film into a photo-finishing service, which develops the film to make prints and/or scans (or otherwise digitizes) the prints or negatives to generate digital image files. The digital image files then can be downloaded by the user or transmitted back to the user by e-mail or on a CD-ROM, diskette, or other removable storage medium. The users can also digitize images from a negative film using a film scanner that is connected to the computer 200 or from a reflective image print using a scanner. Digital images can also be created or edited using an application program 213 (e.g., a graphics program such as Adobe Photoshop).

Once the digital images are stored on the computer 200, a user can perform various operations on them using application programs 213 stored in memory 209. For example, an image viewer application can be used for viewing the images and a photo editor application can be used for touching up and modifying the images. In addition, an electronic messaging (e.g., e-mail) application can be used to transmit the digital images to other users. In accordance with the present invention, one of the application programs 213 can enable the user 210 creating a personalized image-based product on the computer 200. Several of the above described imaging functions can be incorporated in one imaging software, which can be provided by the photo service provider and installed on computer 200 for the user 70. More details about application programs 213 for image enhancement and image management.

In addition to viewing the digital images on the computer display 207, the user 70 may desire to have physical photo products made of digital images. Prints can be generated by the user 70 using a digital printer 230 that is connected to the computer 200. Typical digital printers 230 can include such as an inkjet printer or a dye sublimation printer. The user 70 can also purchase photo products from the online photo service provider. In accordance with embodiments of the present invention, examples of personalized image-based products may include personalized photo greeting cards, photo prints based on silver halide photographic paper (versus ink jet receiver used by ink jet printers), photo books and albums, photo T-shirt, and photo, mugs etc. The personalized image-based products can include users' photos and personalized text. The production of these photo products often require the use of commercial equipment which are usually only available at a commercial production location such as the printing and finishing facilities 40 and 41. One online photo service provider that makes such photo products is Shutterfly, Inc., located at Redwood City, Calif., U.S.A.

In accordance with the present invention, the user 70 can be a consumer that accesses the computer terminal 60 from home or a public entry terminal. The user 70 can also be a business owner or employee that may access the computer terminal 60 at a retail location such as a photo shop or a printing store. In the latter case, the digital images may be generated by a customer of the business and later provided the business for receiving an imaging service. The present invention is compatible with a retail imaging service using a local computer 200 at the point of sales, or an online photo system wherein a user 70 access a server 32 using a remote computer terminal 60. The formats of communication between the computer terminal 60 and the servers 32 as well as the graphic user interface (as described below relating to FIGS. 3 through 7) can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

A typical process of using an online photo service is now described. The user 70 sends digital images to the servers 32 provided by the online photo system 20 by uploading over the Internet 50 using a standard or a proprietary protocol (FTP, HTTP, XML, for example) or electronic communication application (for example, e-mail or special-purpose software provided by the photo-finisher). The user 70 can also send digital image data stored on a physical storage medium such as a memory card or recordable CD by US mail, overnight courier or local delivery service. The photo-finisher can then read the images from the storage medium and return it to the user, potentially in the same package as the user's print order. In addition, the photo service provider can load data or programs for the user's benefit onto the storage medium before returning it to the user. For example, the photo-finisher can load the storage medium with an application program 213 for the user to create a personalized image-based product on his computer 200.

The user 70 can also send a roll of exposed film, and processed film negatives to the photo service provider. The exposed film is processed by the film processor 43 and digitized by the scanner 44 in the printing and finishing facilities 40, 41. The digital image data output from the scanner 44 is stored on the data storage 34.

After the photo service provider has received the user's digital images, the photo service provider can host the images on the online photo website, at which the user can view and access the images using a browser application. The user 70 accesses the online-photo website to designate which of the images should be reproduced on a photo product, parameters relating to printing (e.g., finish, size, number of copies), and one or more recipients 100, 105 to whom the photo products are to be sent.

In addition to hosting the user's images on a web page, the photo service provider usually stores the images in an image archive on in the data storage 34 so that the user 60 and others given authorization by the user (e.g. the share recipient 110) can access them in the future. The photo service provider can also provide sample images for the users to select for use online or producing a physical photo product.

After the user's images have reached the photo service provider and have been made available online, the user can place an order with the photo service provider. One way to place an order is by having the user 70 view the images online, for example, with a browser and selectively designate which images should be printed. The user can also specify one or more recipients 100,105 to whom prints should be distributed and, further, print parameters for each of the individual recipients, for example, not only parameters such as the size, number of copies and print finish, but potentially also custom messages to be printed on the back or front of a print.

The information stored in the data storage 34 is provided to a printing and finishing facilities 40 and 41 for making the photo products. The photo products include photographic prints, but also any other item to which graphical information can be imparted, for example, greeting or holiday cards, books, greeting cards, playing cards, T-shirts, coffee mugs, mouse pads, key-chains, or any other type of gift or novelty item. The photo products are printed by the printer 45 and finished by finishing equipment 46 according to the printing parameters as specified by the user 70. The photo products are then delivered to the specified recipients 100, 105 using standard U.S. Mail, or courier services such as Federal Express or UPS.

Further details on the generation and distribution of photo products using online photo system 20 are provided in the commonly assigned and above referenced U.S. patent application Ser. No. 09/436,704, filed on Nov. 9, 1999, titled "Distributing Images to Multiple Recipients", by Baum and U.S. patent application Ser. No. 09/450,075, filed on Oct. 27, 1999, titled "Printing Images in an Optimized Manner", by Baum, et al. The disclosures of these patent applications are herein incorporated by reference.

Figure 3:
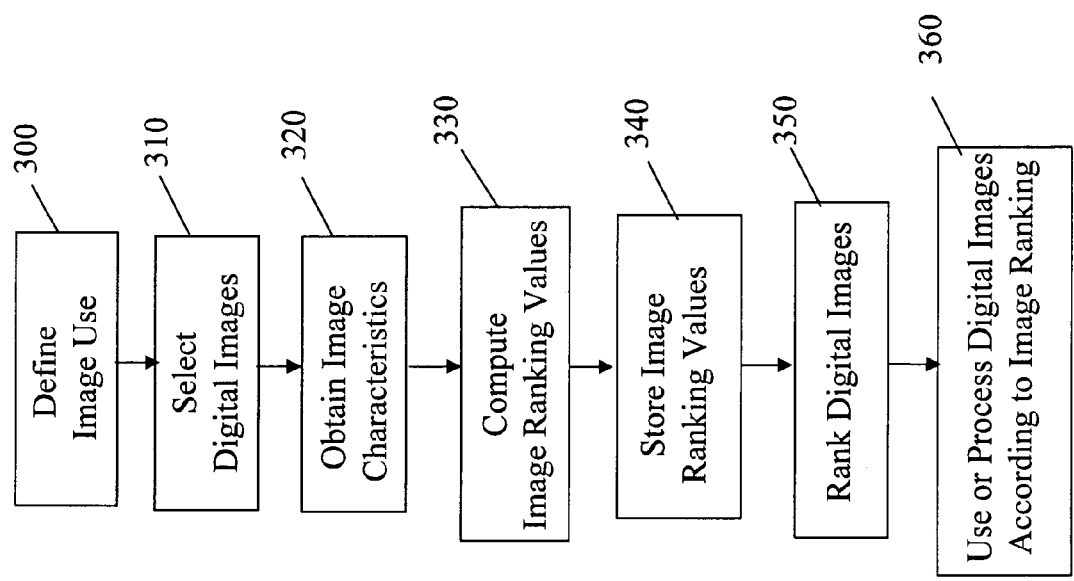
FIG. 3 is a flow diagram for the process of using or processing digital images based on computed image ranking values in accordance to the present invention.

FIG. 3 illustrates the flow diagram of using digital images based on computed image ranking values in accordance to the present invention. The digital images may be obtained by the user 70 or provided by a photo service provider such as online photo system 20. The digital images can be captured by any digital capture devices such as digital cameras, video cameras, reflective or transmissive scanners, film scanners and so on. The content of the images can vary from personal social activities such as vacation, holiday gatherings, parties, wedding, baby pictures, sport activities and so on, to business applications such as product advertisement, and so on. The digital images can reside on a computer located a home or a office, a portable computer such as a Personal Digital Assistant or cell phone, and on a web server and storage devices provided by an online photo system 20. The image ranking system and methods described below are applicable to any computer systems where the digital images are stored.

The user 70 first defines how he or she plans to use the digital images (300). Common image uses include printing photographic prints, electronic image sharing such as sharing digital images over computer network, creating various categories of image-based physical products using the images. Various categories of image-based physical products include photo calendars, photo album, photo greeting cards, personalized gift cards, photo books, photo T-shirt, and photo, mugs etc. The image uses can be defined in the order information defined by the user 70, or can be specified by the user 70 at the user interface before the user creates an order for image-based products.

As an example, the user 70 intends to create a personalized photo calendar. Next the user 70 selects digital images that will be used in the intended image use (310). In the present example of the personalized photo calendar, the digital images should possess good image content (good face expressions, good moment, etc.) as well good image quality properties (high resolution, good color saturation, satisfactory tone scale etc.). A typical calendar may cover a 12-18 month period, which requires one image for each month and a cover image. A substantially large group of images will be selected so more desirable ones can be selected. The selection of digital images can also be based on groups defined by the photographer, the image-capture device (type, model, etc.), image resolution, image content (indoor vs. outdoor), etc. The definition of image use can also begin by user asked questions, such as, "what are the best images for printing?" or "what are the best images for photo greeting cards?" The user interface understands the questions, automatically selects and ranks images according to the specified use.

Next, measurable image characteristics of the selected digital image will be obtained as input to compute image ranking values (320). The measurable image characteristics can include direct and indirect pixel information such as resolution, histogram, compression factor, compressed file size, uncompressed file size, luminance of a whole image or a region of an image, color saturation of a whole image or a region of an image, sharpness and blurriness, color and lighting in the image, color and lightness of memory colors (such as grass green and sky blue), etc. The input image characteristics could also involve all information in the header. of the image file. Standard JPEG and TIFF image format include EXIF tags in the headers of their image files. The header of the image file may reveal information about the capture device of the image, image capture conditions such as aperture settings of the digital camera, and the image editing software used for editing the image.

The computation of the image-ranking values (330) starts with the creation of a ranking mechanism for images. For example, the images can be ranked in a scale of 1 to 10, wherein "10" is the best quality level and "1" is the worst. This ranking scale can be globally applied to all of a user's images. Or alternatively, it can be applied to a particular group of digital images. Different methods can be used to create ranking values for the images. For example, 0.5 Megapixel image can ranked as "1" and 5 Megapixel image as "10". The rank of an arbitrary image is then just a linear mapping between these two end points, clipped to the range [1,10].

The ranking can also be created in a more complex manner by training. For example, a number of people are given a set of images and are asked to rank the images based on some criterion; in most situations the criterion would include ignoring subject matter and concentrating on quality of the picture such as composition, lighting, color balance, etc. The set of images along with their rankings are used as training data. This training data is then used to find appropriate transformations on different image characteristics to finally get a ranking for each image that closely matches the ranking of the training data. For example: Let, X=[charateristic1, characteristic2, . . . , characteristicN]

be all the measurable characteristics of an image. These characteristics need not necessarily be directly measurable, they can be derivatives of directly measurable characteristics also (for e.g.: the square root of image resolution, the average of luminance, etc.). We then construct a family of functions $f_1, f_2, \ldots f_M$, where $f_i: X \to \mathcal{R}$ are mappings from the space of vectors X to the real line $\mathcal{R}$. The mappings provide some rank of the image. The $f_i$'s can be any linear or non-linear functions that map any vector of the characteristics to a number on the real line. Let d(.,.) be a distance-measure function on the real line. For example, $d(a,b)=\sqrt{a^2+b^2}$ or $d(a,b)=|a-b|$, etc. Let there be K images in the training set, we then have $X_1$, $X_2, \ldots, X_k$ feature vectors corresponding to the K images. Our goal is then to find $i' \in [1,M]$ such that the ranking generated by $f_{i'}$ is close to that of the training set. This closeness measure could be an average ranking across all images, maximum difference in ranking, minimum difference in ranking or some other such meaningful criterion.

The image ranking calculations will take into account the specific requirements of the particular intended product and give higher weight to the input image characteristics that are important to that particular intended product. For example, an 8"×10" photo book is best presented if the digital images have high image resolution. Extra weight will be given to image size in ranking images for this product.

After the image ranking values are computed, the image ranking values are stored in association with respective selected digital images (340). The values assigned to each image from the image ranking are stored in association with the digital image. In one embodiment of the present invention, the image-ranking values are stored as a keyword in association with each image. The image-ranking values can be searched across different photo albums similar to other keywords. Furthermore, the specific image usages such as photo prints, photo books, photo albums, and photo calendars can also be stored in association with the image ranking value. Details of assigning and storing keywords for digital images are described in above mentioned and commonly assigned U.S. patent application Ser. No. 9/972,602, filed on Oct. 5, 2000, titled "Managing and searching digital images".

Once the image ranking values are computed and stored, the images can be ranked using the image ranking values (350). In a scale of 1 to 10 where "10" is the best quality level and "1" is the worst, for example, the images can be ranked from high to low ranking values. The image ranking values can be used for selecting a pre-specified number of images or for recommendations for image usages. In a large set of digital images, for example, a user may first pick the top 10% or 20% of the images in ranking values to screen off unwanted digital images. The user can then select images in the selected group using other criteria such as image content and so on. The image ranking can thus be used independently or in corroboration with other selection criteria.

The above-described image-ranking are applicable to many image usages (360). A user can delete digital images that receive low-quality ranking values to free up storage space and simplify image organization. The user can also use the image ranking values to guide which images are likely to produce good quality prints. Image ranking values can indicate which images are suitable for sharing. A user can also use image-ranking values to select images of the same scene subject.

The image ranking values can also be used for managing and organizing digital images. A user may have multiple of photo albums in his web account at the online photo system. He or she may create a favorite folder or album that holds images above certain image-ranking values. The user can further select images based on content for being used in different products or image content. For example, some images may not good image quality for printing, but might have some sentimental, personal, professional, which may be suitable for electronic sharing at screen resolution.

The image-ranking system can be used for recommendations. From a large set of images the user might want to pick the pick the top 10%, top 50% etc. The user can either use the rankings directly or use them as one additional criterion in selecting images. If he user chooses this as one additional criterion, this ranking system can help minimize the number of images to choose from.

Another aspect of the present invention is that image ranking can be conducted automatically as the user 70 uploads images to the online photo system 20. Furthermore, the image rendering can be dependent on the results of the automated image ranking analyses. When the user 70 orders image-based products based on the uploaded images, the images will normally need to be rendered by a number of image processing operations including: gamut mapping, tone calibration, sharpening, resizing, printing-device related calibrations, and so on. Not every of these image rendering steps is appropriate depending on the characteristics of the digital images and the image-product orders that the customer submitted from the images. A warning flag may be raised when an image is of low image ranking value. The rendering algorithm will look into the specific causes for the low image ranking value. For example, if the image ranking value is low because of low image resolution (small image size), the sharpening rendering step will be skipped. In another example, the image ranking value may be low because of an unevenly distributed histogram (e.g. bi-model). Standard tone calibration may be replaced by a specially tailored tone calibration curve. In certain high-value orders, an operator may be alerted to personally check into the images to ensure high quality output for the ordered image products.

In accordance with the present invention, resources of an image service provider can be effectively allocated between human operators and the automated image ranking computer applications. For example, the resource can be allocated differently between consumer customers and professional customers. Less automated image ranking and image enhancement and more human image enhancement may be appropriate for professional customer orders because of the higher quality requirements and high prices charged for the professional products. The decision on allocation between human and automated resources can also depend on the value of the customers, the value of the product or services ordered, the occasion for which the ordered products are ordered (wedding, baby birth, versus usually family photo sharing . . . ), the season of the year, and so on.

Various implementations of the systems and techniques described in this invention are compatible with different computer systems. The image ranking system and methods are applicable to a computer used at home, an office or a retail location, and a server at a website hosted by an online photo system 20. The image ranking system and methods can also be used on various imaging devices such as digital camera, video camera, digital printer, scanners, and imaging kiosks.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

ELEMENT NUMBER LIST 10 system for producing personalized image-based products
20 online photo system
30 data center
32 server
34 data storage devices
36 computer processor
40 printing and finishing facility
41 printing and finishing facility
42 network server
43 film processor
44 scanner
45 printer
46 finishing equipment
48 shipping station
50 Internet
60 computer terminal
70 user
80 computer network
100 recipient
105 recipient
110 share recipient
200 computer
203 mouse
205 keyboard
206 card reader
207 computer display
208 digital camera
209 memory
210 non-volatile memory
211 operating system
213 application program
217 I/O unit
221 Central Processing Unit (CPU)
223 communication device
225 communications link
230 digital printer
310 select digital images
320 obtain image characteristics
330 compute image ranking values
340 store image ranking values
350 rank digital images
360 use or process digital images according to image ranking

What is claimed is:

1. A computer-assisted method, comprising:
   receiving a plurality of digital images from a user;
   defining a plurality of image uses for the plurality of digital images;
   obtaining one or more image characteristics for one of the plurality of digital images; and
   for each of the plurality of image uses, computing an image-ranking value for the one of the plurality of digital images using the one or more image characteristics, wherein the image-ranking value is specific to each of the plurality of image uses.

2. The method of claim 1, wherein the step of computing comprises:
   using the one or more image characteristics to define a vector in a multi-dimensional space; and
   computing the image-ranking value based on a predetermined function of the vector.

3. The method of claim 1, further comprising:
   computing image-ranking values for the plurality of digital images; and
   ranking the plurality of digital images using their respective image-ranking values.

4. The method of claim 1, further comprising:
   computing image-ranking values for the plurality of digital images; and
   for each of the plurality of image uses, ranking the plurality of digital images using their respective image-ranking values.

5. The method of claim 1, further comprising:
   computing image-ranking values for the plurality of digital images; and
   selecting one or more of the plurality of digital images using their respective image-ranking values.

6. The method of claim 1, further comprising:
   computing image-ranking values for the plurality of digital images; and
   for each of the plurality of image uses, selecting one or more of the plurality of digital images using their computed image-ranking values.

7. The method of claim 1, further comprising:
   computing image-ranking values for the plurality of digital images; and
   determining if one of the plurality of digital images is suitable for one of the plurality of image uses using the respective image-ranking value for the digital image and for the image use.

8. The method of claim 1, further comprising:
   storing the plurality of digital images on a computer storage; and
   deleting one of the plurality of digital images from the computer storage if the image-ranking value of the one of the plurality of digital images does not satisfy a predetermined criterion.

9. The method of claim 1, further comprising:
   storing the image-ranking values as a keywords in association with the one of the plurality of digital images.

10. The method of claim 9, further comprising:
    matching the keyword to the image-ranking value in association with a digital image; and
    identifying the digital image having the associated image-ranking value that matches the keyword.

11. The method of claim 1, wherein the plurality of image uses are selected from the group consisting of photographic prints, electronic image sharing, photo cards, photo calendars, photo album, and photo books.

12. The method of claim 1, wherein the image characteristics comprise one or more of image size, color, exposure condition, pixel value histogram distribution, and the header information of a digital image.

13. The method of claim 1, wherein the step of computing comprises:
   computing an image-ranking value for at least one of the plurality of digital images using a vector scale to represent the image characteristics for the digital image.

14. The method of claim 1, further comprising:
   rendering the one of the plurality of digital images using the image-ranking value associated with one of the plurality of image uses.

15. The method of claim 1, further comprising:
   producing an imaging product or providing an imaging service using the one of the plurality of digital images in accordance with the image-ranking value and the associated one of the plurality of image uses.

16. A computer-assisted method, comprising:
   receiving a plurality of digital images from a user;
   defining a plurality of image uses for the plurality of digital images;
   receiving one or more image characteristics for each of the plurality of digital images;
   for each of the plurality of image uses, computing an image-ranking value for each of the plurality of digital images using the one or more image characteristics, wherein the computed image-ranking value is specific to each of the plurality of image uses;
   for each of the plurality of image uses, ranking the plurality of digital images using their respective image-ranking values; and
   for each of the plurality of image uses, selecting one or more of the plurality of digital images using their computed image-ranking values.

17. The method of claim 16, further comprising:
   determining if one of the plurality of digital images is suitable for one of the plurality of image uses using the computed image-ranking value for the digital image and for the image use.

18. The method of claim 16, further comprising:
   storing the computed image-ranking values as a keywords in association with the respective digital images.

19. The method of claim 16, further comprising:
   rendering one of the plurality of digital images using the image-ranking value; and
   producing an imaging product or providing an imaging service using the rendered digital image in accordance with the image use.

20. A system for producing an imaging product, comprising:
   a server configured to receive, from a user, a plurality of digital images and a plurality of image uses for the plurality of digital images;
   a computer processor configured to obtain one or more image characteristics for each of the plurality of digital images and to compute an image-ranking value for at least one of the plurality of digital images using the one or more image characteristics for the digital image for each of the plurality of image uses; and
   a fulfillment facility configured to produce an imaging product or provide an imaging service using the digital image in accordance with the image use and the computed image-ranking value associated with the digital image and the plurality of image use.

* * * * *